(12) United States Patent  
Sugawara et al.

(10) Patent No.: US 6,545,832 B1  
(45) Date of Patent: Apr. 8, 2003

(54) DISK DRIVE CAPABLE OF REREADING SAME SIGNAL FROM DISK IN CASE OF ERROR IN READ SIGNAL

(75) Inventors: Takayuki Sugawara, Fukushima-ken (JP); Takahiro Kawauchi, Fukushima-ken (JP); Kazuya Seta, Kanagawa-ken (JP)

(73) Assignees: Alps Electric Co., Ltd., Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/416,040

(22) Filed: Oct. 12, 1999

(30) Foreign Application Priority Data

Oct. 14, 1998 (JP) .......................................... 10-291844

(51) Int. Cl.[7] .................................................. G11B 5/09
(52) U.S. Cl. ........................... 360/53; 360/46; 714/704; 714/769
(58) Field of Search ................ 360/53, 65, 67, 360/46, 31, 25; 714/704, 769; G11B 20/18

(56) References Cited

U.S. PATENT DOCUMENTS

| | | | |
|---|---|---|---|
| 4,003,086 A | * | 1/1977 | Larsen et al. .................. 360/53 |
| 5,150,050 A | | 9/1992 | Genheimer et al. |
| 5,379,162 A | | 1/1995 | Cunningham et al. |
| 5,438,462 A | * | 8/1995 | Copolillo ...................... 360/53 |
| 5,533,031 A | | 7/1996 | Dounn et al. |
| 5,808,825 A | | 9/1998 | Okamura |
| 5,978,162 A | * | 11/1999 | Behrens et al. ............... 360/53 |
| 6,289,483 B1 | * | 9/2001 | Ohtaki ........................ 714/769 |
| 6,381,725 B1 | * | 4/2002 | Isokawa ...................... 714/769 |

FOREIGN PATENT DOCUMENTS

| | | |
|---|---|---|
| EP | 0 447 246 A2 | 9/1991 |
| EP | 0 523 952 A2 | 1/1993 |

* cited by examiner

*Primary Examiner*—David Hudspeth  
*Assistant Examiner*—Dan I. Davidson  
(74) *Attorney, Agent, or Firm*—Brinks Hofer Gilson & Lione

(57) ABSTRACT

A parameter value is set in a register. A signal is read based on the parameter value. When an error is recognized from an MSE value calculated by a Viterbi decoder, the parameter value is changed and the signal is reread. A new parameter value is calculated based on a change value by which the parameter value is changed and the MSE value. The new parameter value is stored in the register. Thus, an error rate can be converged as a result of the retry.

4 Claims, 2 Drawing Sheets

DISK DRIVE CAPABLE OF REREADING SAME SIGNAL FROM DISK IN CASE OF ERROR IN READ SIGNAL

BACKGROUND OF THE INVENTION

1. Field of the Invention

The present invention relates to a disk drive in which when an error is detected in a signal read from a disk, a retry operation is performed for rereading the same signal from the disk.

2. Description of the Related Art

A signal read from a disk, which is loaded in a hard disk drive, using heads contains an error checking code. The error checking code is used to check or correct a read signal for an error. If an error occurs in a signal read using the heads or an error value is equal to or larger than a predetermined value, a retry operation is performed for rereading the same signal from the disk.

The retry operation is generally performed based on a table like Table 1.

TABLE 1

Retry Table

| Retry No. | Contents of Correction |
|---|---|
| 1 | Off-track read + 10% |
| 2 | Off-track read − 10% |
| 3 | Channel cutoff − 10% |
| . . . | |
| 24 | RHP boost + 10% |
| 25 | LHP boost − 15% |

The left column of Table 1 indicates retry numbers, and the right column thereof describes the contents of correction. For example, the first retry operation, a magnitude off-track by which the heads come off from a track on the disk is set to +10%. For the second retry operation, the magnitude of off-track is set to −10%. For the third retry operation, the cutoff frequency of a low-pass filter is changed by −10%. Moreover, the capacitances of RHP and LHP boost capacitors stored in registers determines a response time required by the low-pass filter. The asymmetry of the signal read using the head varies depending on the capacitances of the RHP and LHP boost capacitors.

A retry is carried out a predetermined times according to the table like Table 1. If an error rate does not fall below a predetermined value through the predetermined number of retries, the retry operation is suspended. The signal read using the heads is ranked as an unreadable signal.

However, as far as the retry operation based on the table like Table 1 is concerned, the probability at which the error rate may is converged owing to the retry operation is low. Moreover, when many parameters are specified as the conditions for reading, the number of necessary retries indicated in the table like Table 1 becomes very large.

For hard disk drives, the quality of disks is managed carefully and the disks are of the same kind. Moreover, a change in the relative position of a disk with respect to heads or a change in a use environment can be predicted. As shown in Table 1, the number of parameters that should be varied for each retry operation is relatively small.

However, when different kinds of disks including a flexible magnetic disk for high-density recording are loaded in a disk drive, individual disks are different from one another in terms of quality. Moreover, the individual disks are different from one another in terms of how a signal is recorded. For using this kind of disk in combination with a disk drive, consideration must be taken into the compatibility of a disk with a disk drive. Moreover, such factors of a use environment as temperature, humidity, and voltage are variable. For example, assume that the number of parameters that should be varied for each retry is five and each parameter is varied in five steps. In this case, the number of settings of conditions for reading is 3125 or the fifth power of 5. If all the variable parameters were listed as a table like Table 1, the number of retries would be very large. It would take along time to complete a retry operation.

Moreover, if the number of parameters and the number steps in which the parameters are varied were made smaller, the probability that an error detected in a read signal can be repaired would be lowered.

By the way, test data is written or read in or from the flexible magnetic disk for high-density recording during a quality test to be conducted after completion of manufacturing. At this time, if data cannot be read normally, the same retry operation as the foregoing one is carried out. If an error rate at which an error is detected in a read signal does not fall below a predetermined value through a predetermined number of retry operations, a sector concerned is judged as a defective sector. The sector number of the sector is registered as that of a defective sector in a maintenance area on a magnetic disk.

When this kind of magnetic disk is loaded in a normal disk drive, the maintenance area is read first. The defective sector number is identified, and the defective sector will not be used for recording.

However, even when a sector of a disk has not been registered as a defective sector during a quality test, the disk may presumably be flawed during a normal use after delivery. Otherwise, dust may be interposed between a disk and a head. This raises an error rate at which an error occurs in reading a signal. Consequently, while data is being reproduced from a sector that has not been registered as a defective sector in the maintenance area on a disk, it may be requested to carry out a retry operation with various parameters varied as mentioned above. At this time, unless the various parameters are optimized and a retry is carried out, the probability that the error may not be able to be repaired gets higher.

SUMMARY OF THE INVENTION

The present invention attempts to overcome the foregoing drawbacks of related arts. An object of the present invention is to provide a disk drive capable of acquiring a normal read signal or a read signal whose error can be corrected by performing the smallest number of retries according to a so-called fast diving method. According to the fast diving method, parameters are set based on change values by which parameter values are changed for each retry operation and the magnitude of a change in an error value in data read during a retry, so that the error value can be converged.

Another object of the present invention is to provide a disk drive capable of identifying a sector, which cannot be recovered by performing a retry, as a defective sector. At the time of a quality test to be conducted before delivery of a disk, a retry is performed under severe conditions than it is performed on a disk used by a user. Thus, the disk drive has decreased the frequency of occurrence by which a retry occurs during use of a disk by a user.

According to the present invention, there is provided a disk drive in which a signal recorded on a disk is read using heads and in which when an error is detected in the read signal, a retry operation is performed for rereading the same signal recorded on the disk. The disk drive includes an error detection unit, a memory, and a control unit. The error detection unit detects an error value in a signal read using the heads. A set value of a parameter concerning the relative position of the heads with respect to a disk attained at the time of reading the signal and/or a set value of a parameter concerning a circuit for processing the signal read using the heads is stored in the memory. When the control unit judges from an error value in a signal read using the heads that a retry is needed, the control unit changes the parameter value by a predetermined value and instructs rereading of the signal. Moreover, the control unit calculates a new parameter value according to a change value by which the parameter value is changed and a change in an error value detected in a reread signal. The control unit updates the parameter value stored in the memory with the new parameter value. If rereading is still needed, the new parameter value is changed by the predetermined value and the signal is reread. Another new parameter value is calculated and the stored parameter value is updated with the new parameter value. The control unit repeats this retry operation until the error is eliminated, until the error value falls below a predefined value, or until the number of retries reaches a predetermined number of retries.

For example, a change value β by which a parameter value is changed for each retry operation and a coefficient of update α are predetermined. Assuming that the parameter value stored in the memory is P, the parameter value P is changed by the change value β and the signal is reread during the retry operation. If the magnitude of a change in an error value is δE, P'=P−α·(δE/β) is solved. P' is regarded as a new parameter value with which-the contents-of the memory are updated.

In other words, when any parameter value is changed by a predetermined value for each retry, a parameter value to be set for the next retry is calculated based on the magnitude of a change in an error and the change value by which the parameter value is changed. Consequently, the error value can be gradually converged to zero with the progress of repetition of a retry. Thus, an error can be repaired by performing a small number of retries.

Moreover, a maintenance area in which a defective sector is registered during a disk test is defined on a magnetic disk. A table listing parameter values stepwise is used for the disk test. When an error value detected in a recorded signal is equal to or larger than a predetermined value, a retry operation based on the table is repeated a predetermined number of times. When the error value does not fall below the predetermined value through the predetermined number of retries, a sector concerned is regarded as a defective sector. The detective sector is preferably registered in the maintenance area.

As part of a quality test to be conducted prior to delivery of a disk, a retry is carried out according to the table method described in conjunction with the related art. A sector that cannot be recovered from an error is registered as a defective sector in the maintenance area on a disk.

When the disk is loaded in a user's disk drive, a retry operation is performed based on the setting of a parameter determined using the aforesaid arithmetic operation. Even when a sector of a disk is not registered as a defective sector at the time of a quality test, if the disk is flawed after delivery, an error rate at which an error is detected in a signal read from the sector is high. Nevertheless, once a retry is carried out using the arithmetic operation, the probability of succeeding in repairing an error can be raised.

DESCRIPTION OF THE PREFERRED EMBODIMENT

Figure 1:
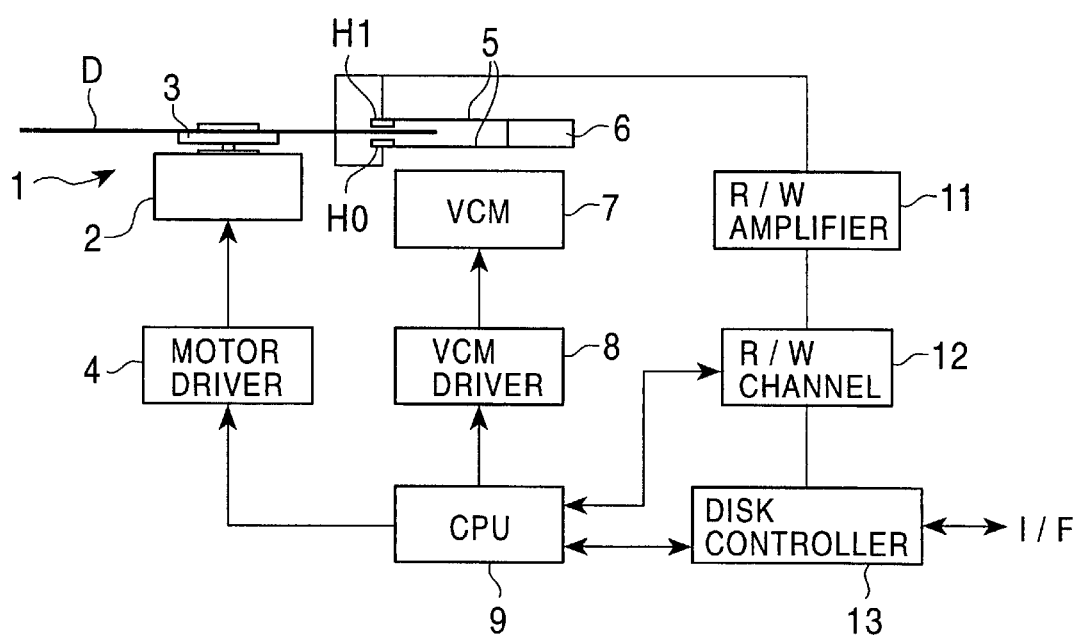
FIG. 1 is a block diagram outlining the circuitry of a magnetic disk drive.
Figure 2:
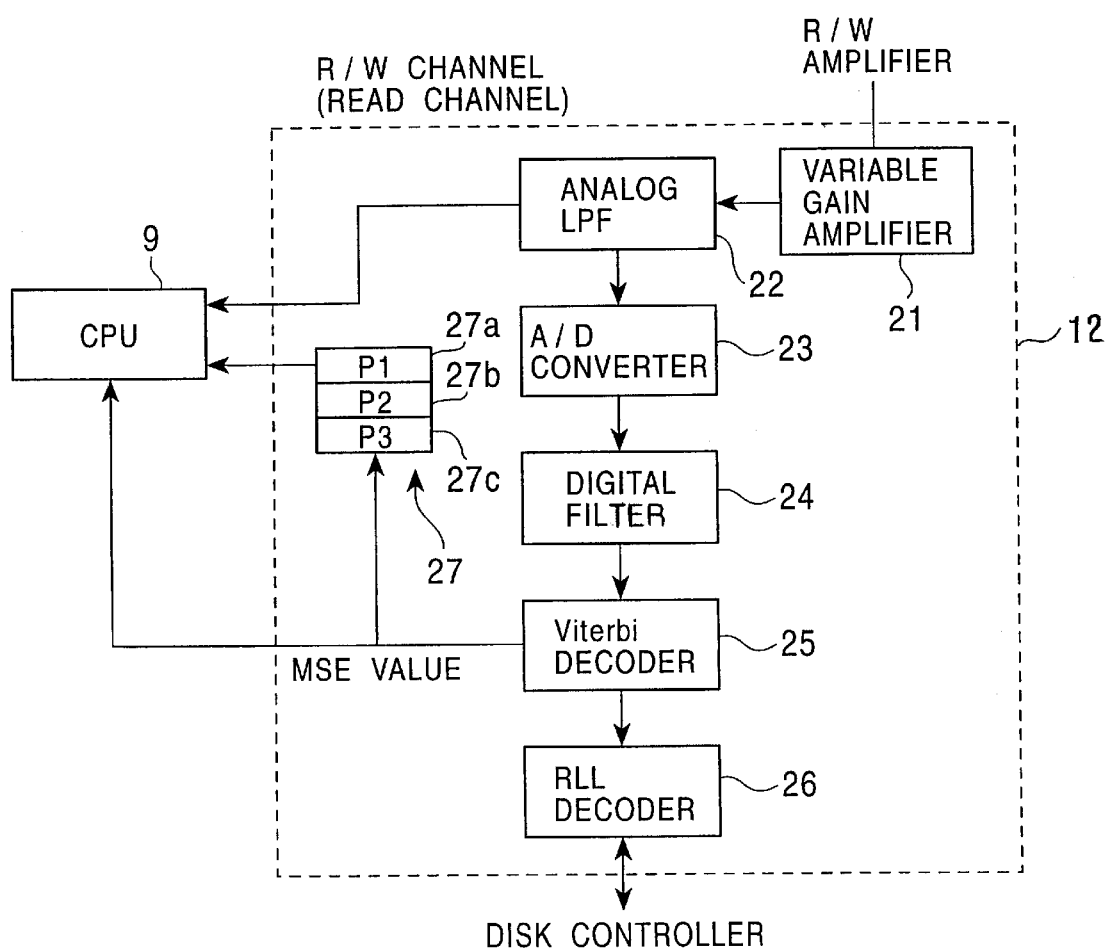
FIG. 2 is a block diagram showing the circuitry of a reproduction system of a R/W channel.

FIG. 1 and FIG. 2 are block diagrams showing a disk drive in accordance with the present invention.

In a rotary driving unit 1, the center of a disk D is clamped by a turn table 3 that is driven to rotate by means of a spindle motor 2. The disk D is, for example, a flexible disk-for-high-density recording. The disk D is externally inserted into the disk drive and loaded in the rotary driving unit 1. Moreover, the spindle motor 2 is driven and controlled by a motor driver 4.

A magnetic head H0 located on one side 0 of the disk D and a magnetic head H1 located on the other side 1 thereof and opposed to the magnetic head H0 are borne by support arms 5 fixed to a head base 6. The head base 6 is driven in a radial direction of the disk D by a voice coil motor (VCM) 7 that is a linear motor driver. The VCM 7 is driven and controlled by a VCM driver 8.

The motor driver 4 and VCM driver 8 operate in response to a control signal sent from a CPU 9 serving as a control unit.

The heads H0 and H1 are connected to a read/write (R/W) amplifier 11. The R/W amplifier 11 is connected to a R/W channel 12. A disk controller 13 is connected to a host computer via an input/output interface. A recording signal sent from the host computer is formatted by the disk controller 13 and supplied to the heads H0 and H1 via the R/W channel 12 and R/W amplifier 11. A signal read from the disk D by the heads H1 and H0 are supplied to the disk controller 13 via the R/W amplifier 11 and R/W channel 12. The signal is then reformatted and sent to the host computer.

FIG. 2 shows the circuitry of a reading system of the R/W channel 12.

A read signal passing through the R/W amplifier 11 is sent to the disk controller 13 by way of a gain variation amplifier 21, an analog low-pass filter (LPF) 22, an A/D converter 23, a digital filter 24, a Viterbi decoder 25, and a run length limited (RLL) decoder 26. Moreover, the R/W channel 12 is provided with a register unit 27 having a predetermined number of stages of registers.

The Viterbi decoder 25 is designed to detect the most reliable data stream in a reproduced digital signal and decode the data stream. An error stemming from a noise and occurring in detecting data can be corrected to some extent.

In the disk drive, a mean square error (MSE) value detected by the Viterbi decoder 25 is used as an error value detected in a reproduced signal during a retry operation. In other words, the Viterbi decoder 25 functions as an error detection unit. The MSE value is calculated as a difference of the most reliable data to be decoded by the Viterbi decoder 25 from an ideal value. Specifically, the MSE value is a sum of squares of differences of all bits of digital data, which is output from the A/D converter 23, from ideal values.

Moreover, the run length limited (RLL) decoder 26 demodulates a signal that has been encoded according to a 16-17 transformation technique or the like and recorded on the disk D.

Next, a description will be made of a retry operation to be performed for reading a signal recorded on the disk D using the disk drive.

The register unit 27 shown in FIG. 2 has three registers 27a, 27b, and 27c. A parameter to be changed for reading data using the heads is registered in each of the three registers.

For example, a set value of the capacitance of a RHP boost capacitor is stored as an initial value P1 in the register 27a. A set value of the capacitance of an LHP boost capacitor is stored as an initial value P2 in the register 27b. A set value of the cutoff frequency of the analog LPF 22 is stored as an initial value P3 in the register 27c. The capacitances of the RHP and LHP boost capacitors determine the asymmetry of the waveform of a read signal passing through the analog LPF 22. The cutoff frequency of the analog LPF 22 is determined with the set value.

At every retry operation, the MSE value is calculated from a read output. The set values P1, P2, and P3 of the capacitances of the RHP and LHP boost capacitors, and the cutoff frequency are changed until the MSE value converges. In other words, the three parameters are changed concurrently for one retry operation.

Incidentally, the number of registers in the register unit 27 may be increased and parameters other than the three parameters may be stored in the registers. The other parameters to be stored include, for example, a parameter concerning a circuit such as a gain to be produced by the gain variation amplifier 21, and a change rate at which magnitudes of off-track in positive and negative directions by which the heads come off from a track on a disk are changed by shifting the heads H0 and H1 using the VCM driver 8.

Table 2 lists coefficients used to change the set values of the three parameters stored in the registers 27a, 27b, and 27c, and change values. The coefficients of update used to update the capacitances of the RHP and LHP boost capacitors, and cutoff frequency shall be $\alpha1$, $\alpha2$, and $\alpha3$. The change values by which the capacitances of the RHP and LHP boost capacitors and the cutoff frequency are actually changed shall be $\beta1$, $\beta2$, and $\beta3$ respectively. The coefficients of update and change values are pre-set in registers in, for example, the CPU.

TABLE 2

| Parameter (P) | Coefficient of update ($\alpha$) | Change value ($\beta$) |
|---|---|---|
| P1: capacitance of RHP boost capacitor | $\alpha1 = 4$ | $\beta1 = 1$ |
| P2: capacitance of LHP boost capacitor | $\alpha2 = 4$ | $\beta2 = 1$ |
| P3: cutoff frequency | $\alpha3 = 40$ | $\beta3 = 8$ |

The initial set values of the capacitances of the RHP and LHP boost capacitors and the cutoff frequency stored in the registers 27a, 27b, and 27c shall be P1, P2, and P3 respectively. Normally, a signal recorded on the disk D is read using the heads according to the parameters set to the initial values. When the read output is decoded by the Viterbi decoder 25, an MSE value is calculated as an error value. When the CPU 9 judges from the MSE value that an error has occurred or that the MSE value is equal to or larger than a predefined value, a retry is carried out.

During the retry operation, the parameters P1, P2, and P3 are changed by the change values $\beta1$, $\beta2$, and $\beta3$ respectively listed in Table 2. Specifically, the capacitances of the RHP and LHP boost capacitors constituting the analog LPF 22 and the cutoff frequency of the analog LPF 22 are changed by $\beta1$, $\beta2$, and $\beta3$ from P1, P2, and P3 stored in the registers 27a, 27b, and 27c. New capacitances of the RHP and LHP boost capacitors and a new cutoff frequency are used to reread the signal from the track from which the signal has been read previously. Assuming that the magnitude of a change in the MSE value calculated by the Viterbi decoder (a magnitude of improvement) is $\delta E$, the CPU 9 performs such arithmetic operations as P1'=P1−$\alpha1$·($\delta E/\beta1$), P2'=P2−$\alpha2$·($\delta E/\beta2$), and P3'=P3−$\alpha3$·($\delta E/\beta3$). P1', P2', and P3' are then stored as new parameter values of the capacitances of the RHP and LHP boost capacitors and the cutoff frequency, whereby the contents of the registers 27a, 27b, and 27c are updated.

When no error is found in a reread signal or when the MSE value falls below the predefined value, a retry is suspended. A signal recorded in a different sector is read. At this time, the new parameter values P1', P2', and P3' are employed.

When an error is still found in a reread signal or when the MSE value is equal to or larger than the predefined value, reading of the same signal is repeated. At this time, the set values P1', P2', and P3' stored in the registers 27a, 27b, and 27c are further changed, and the foregoing arithmetic operations are carried out. Calculated values are stored as new parameter values in the registers 27a, 27b, and 27c. The coefficients of update $\alpha1$, $\alpha2$, and $\alpha3$ and the change values $\beta1$, $\beta2$, and $\beta3$ may be the same as those employed in the previous retry operation. Otherwise, the coefficients of update $\alpha1$, $\alpha2$, and $\alpha3$ and the change values $\beta1$, $\beta2$, and $\beta3$ may be changed at every retry. When the coefficients of update and change values are changed at every retry, the values to which the coefficients of update and change values are set may be preserved in association with retry numbers in the form of a table in a memory area in the CPU.

When an error is eliminated due to repetition of a retry or when the MSE value falls below the predefined value or when a retry is carried out a predetermined number of times, the retry is suspended.

When an error is eliminated by performing a retry or an error rate is lowered by performing a retry, if decoded data becomes optimal, the parameter values P1', P2', and P3' are held in the registers 27a, 27b, and 27c. Another signal is then read based on the parameter values. When a read zone on a disk has been changed to another, or when the disk D is unloaded from the disk drive, or when a certain time has elapsed, the parameter values in the registers 27a, 27b, and 27c are initialized to P1, P2, and P3.

Table 3 lists an example of parameter values and values serving as the MSE value used to carry out the foregoing retry operation. Table 3 demonstrates that the MSE value decreases with repetition of a retry.

TABLE 3

| Retry No. | Capacitance of R boost capacitor | Capacitance of L boost capacitor | Cutoff frequency | MSE value |
|---|---|---|---|---|
| 00 | 10 | 18 | 63 | 0035 |
| 01 | 10 | 18 | 6E | 0028 |
| 02 | 10 | 18 | 72 | 0026 |
| 03 | 10 | 18 | 78 | 0021 |
| 04 | 10 | 18 | 7D | 0020 |
| 05 | 11 | 18 | 7F | 001C |
| 06 | 11 | 18 | 81 | 001C |

TABLE 3-continued

| Retry No. | Capacitance of R boost capacitor | Capacitance of L boost capacitor | Cutoff frequency | MSE value |
|---|---|---|---|---|
| 07 | 11 | 18 | 84 | 001B |
| 08 | 11 | 18 | 87 | 001A |
| 09 | 11 | 18 | 89 | 001A |
| 0A | 11 | 18 | 8C | 0019 |
| 0B | 12 | 18 | 8D | 0017 |
| 0C | 12 | 18 | 8F | 0017 |
| 0D | 12 | 18 | 8F | 0016 |
| 0E | 12 | 18 | 8F | 0016 |
| 0F | 12 | 18 | 8E | 0016 |
| 10 | 12 | 18 | 90 | 0016 |
| 11 | 12 | 18 | 90 | 0017 |
| 12 | 12 | 18 | 92 | 0018 |
| 13 | 13 | 18 | 93 | 0016 |
| 14 | 13 | 18 | 92 | 0015 |
| min | 13 | 18 | 92 | 0015 |

Thereafter, a test signal is recorded and reproduced on from the disk D to be loaded in the disk drive during a quality test prior to delivery. A reproduced output is checked to see if data is correct. A sector whose error is high is recorded as a defective sector in the maintenance area on the disk.

When a delivered disk is loaded in a normal disk drive used by a user, the heads H0 and H1 shown in FIG. 1 read data from the maintenance area. The defective sector recorded in the maintenance area is identified, and the defective sector number is stored in a RAM in the CPU 9.

When the disk is loaded in the disk drive, it is judged whether a sector on the disk D from which data is about to be read is the defective sector stored in the RAM. If the sector is judged as the defective sector, a read gate is not opened for the sector and no data is read.

During a quality test to be conducted prior to delivery, a test signal is recorded on a disk and read. If an error rate observed during the reading is high, the parameter values P1, P2, and P3 should preferably be updated according to the conventional retry method based on the table like Table 1 instead of the fast diving method using the aforesaid arithmetic operations.

According to the retry method based on the table like Table 1, a sector in which a small error has occurred is recognized as a defective sector and registered in the maintenance area. It can therefore be prevented that when data is reproduced using a user's disk drive, a sector exhibiting a high error rate at which an error is detected in a read output can be prevented from being used. Moreover, a read error may occur because of a flaw created on a disk after delivery. Even in this case, when a retry is carried out by performing the arithmetic operations using listings like Tables 2 and 3, error recovery can be achieved easily.

As described so far, according to the present invention, an error rate can be converged during a retry of reading. An error can be repaired by performing the smallest number of retries.

Moreover, when the conditions for a retry to be performed as part of a test for checking a disk prior to delivery are made severer than the conditions for a retry to be performed in a user's disk drive, the probability that an error occurs in reading a sector of a disk used by a user can be lowered. Moreover, if an error should occur, the error can be repaired at a high probability by performing the retry.

What is claimed is:

1. A disk drive in which a signal recorded on a disk is read using heads, and in which when an error is detected in the read signal, a retry operation is carried out for rereading the same signal recorded on the disk, said disk drive comprising:

an error detection unit for detecting an error value in the signal read using the heads;

a memory in which a set value of a parameter concerning a relative position of the heads with respect to the disk attained at the time of reading the signal and/or a set value of a parameter concerning a circuit for processing a signal read using the heads is stored; and a control unit that when judging from the error value detected in the signal read using the heads that a first retry operation is needed, (a) changes the parameter value by a predetermined value, (b) instructs rereading of the same signal, (c) calculates a first new parameter value according to a change value β by which the parameter value is changed and a magnitude of a change in an error value detected between the read and a reread signal, and (d) updates the parameter value stored in said memory using the first new parameter value, and the control unit repeats steps (a)–(d) until an error is eliminated or the error value falls below a predefined value or until the number of rereadings (retries) reaches a predetermined number.

2. A disk drive according to claim 1, wherein the change value β by which the parameter value is changed for the retry operation and a coefficient of update α are predetermined, wherein assuming that the parameter value stored in said memory is P, the parameter value P is changed by the change value β and the signal is reread during the first retry operation, wherein when the magnitude of a change in an error value detected between the read and reread signal is δE, P'=P−α·(δE/β) is solved, and wherein P' is regarded as a second new parameter value used to update the contents of said memory.

3. A disk drive according to claim 1, wherein the disk has a maintenance area in which a defective sector is registered during a disk test, wherein a table listing parameter values stepwise is used for the disk test, wherein when the error value detected in the read signal is equal to or larger than the predetermined value, a second retry operation based on the table is performed a predetermined number of times, and wherein when the error value does not fall below the predetermined value through the predetermined number of retries, a sector concerned is regarded as a defective sector and registered in the maintenance area.

4. A disk drive according to claim 3, wherein the disk comprises a magnetic disk.

* * * * *